United States Patent
Hansen

(10) Patent No.: US 8,851,269 B2
(45) Date of Patent: Oct. 7, 2014

(54) APPARATUS FOR CONVEYING AND SELECTIVELY DISCHARGING PRODUCTS

(75) Inventor: Henning I. Hansen, Odense (DK)

(73) Assignee: Cabinplant International A/S, Haarby (DK)

( * ) Notice: Subject to any disclaimer, the term of this patent is extended or adjusted under 35 U.S.C. 154(b) by 0 days.

(21) Appl. No.: 13/983,484

(22) PCT Filed: Feb. 3, 2012

(86) PCT No.: PCT/EP2012/051830
§ 371 (c)(1),
(2), (4) Date: Nov. 12, 2013

(87) PCT Pub. No.: WO2012/104404
PCT Pub. Date: Aug. 9, 2012

(65) Prior Publication Data
US 2014/0054133 A1 Feb. 27, 2014

Related U.S. Application Data

(60) Provisional application No. 61/441,978, filed on Feb. 11, 2011.

(30) Foreign Application Priority Data

Feb. 4, 2011 (EP) .................................... 11153362

(51) Int. Cl.
| | |
|---|---|
| B65G 47/46 | (2006.01) |
| G01G 13/24 | (2006.01) |
| G01G 13/02 | (2006.01) |
| B65B 57/20 | (2006.01) |
| B65B 5/08 | (2006.01) |
| B65B 35/08 | (2006.01) |
| B65B 57/14 | (2006.01) |

(52) U.S. Cl.
CPC .............. *B65G 47/46* (2013.01); *G01G 13/248* (2013.01); *G01G 13/026* (2013.01); *B65B 57/20* (2013.01); *B65B 5/08* (2013.01); *B65B 35/08* (2013.01); *B65B 57/14* (2013.01); *Y10S 198/959* (2013.01)

USPC ........... 198/563; 198/544; 198/545; 198/671; 198/617; 198/959; 177/25.18; 177/120; 177/121

(58) Field of Classification Search
USPC .............. 198/418.1, 560, 562, 563, 543–545, 198/670, 671, 959, 617; 177/25.18, 177/119–121; 222/55, 77
See application file for complete search history.

(56) References Cited

U.S. PATENT DOCUMENTS

| | | | |
|---|---|---|---|
| 4,569,434 A | | 2/1986 | Horii et al. |
| 5,379,923 A | * | 1/1995 | Sagastegui et al. ........ 222/181.2 |

(Continued)

FOREIGN PATENT DOCUMENTS

| | | |
|---|---|---|
| EP | 0593126 | 4/1994 |
| EP | 0900601 | 3/1999 |

(Continued)

OTHER PUBLICATIONS

International Search Report on corresponding PCT application (PCT/EP2012/051830) from International Searching Authority (EPO) dated May 11, 2012.

*Primary Examiner* — Mark A Deuble
(74) *Attorney, Agent, or Firm* — Klein, O'Neill & Singh, LLP

(57) ABSTRACT

The present invention relates to a method of conveying and selectively discharging food products by providing a feeding system. The feeding system (14) comprises an inlet end (20), an outlet end (22), a receptacle (24) below the outlet end, a determination unit at the outlet end (22) and a feeder (18) for conveying the food products from the inlet end to the outlet end. When no food product is present at the outlet or in the receptacle (24), the food products are conveyed at a first average velocity. When a food product is present at the outlet end (22) and no food product is present in the receptacle (24), the food products are conveyed at a second average velocity. The second average velocity is lower than the first average velocity. When the food product is leaving the outlet end or is received within the receptacle (24), the feeder (18) is stopped until the individual food product has left the receptacle.

16 Claims, 9 Drawing Sheets

(56) References Cited

U.S. PATENT DOCUMENTS

| | | |
|---|---|---|
| 5,526,437 A | 6/1996 | West |
| 5,753,866 A * | 5/1998 | Ikeda et al. .............. 177/25.18 |
| 5,813,195 A | 9/1998 | Nielsen et al. |
| 6,015,049 A | 1/2000 | Heikes |
| 6,234,297 B1 | 5/2001 | Blanc |
| 6,321,914 B1 | 11/2001 | Magnusson et al. |
| 6,394,308 B1 | 5/2002 | Yuyama et al. |
| 7,301,110 B2 * | 11/2007 | Hansen .............. 177/25.18 |
| 7,732,718 B2 * | 6/2010 | Tatsuoka et al. ......... 177/25.18 |
| 8,188,383 B2 * | 5/2012 | Mikami .............. 177/25.18 |
| 2004/0245027 A1 * | 12/2004 | Kawanishi et al. ........ 177/105 |
| 2006/0162970 A1 * | 7/2006 | Gudjonsson et al. ....... 177/121 |
| 2007/0193787 A1 * | 8/2007 | Hansen .............. 177/64 |

FOREIGN PATENT DOCUMENTS

| | | |
|---|---|---|
| GB | 937298 | 9/1963 |
| WO | WO 98/49892 | 11/1998 |
| WO | WO 01/02251 | 1/2001 |
| WO | WO2006/092148 | 9/2006 |

* cited by examiner

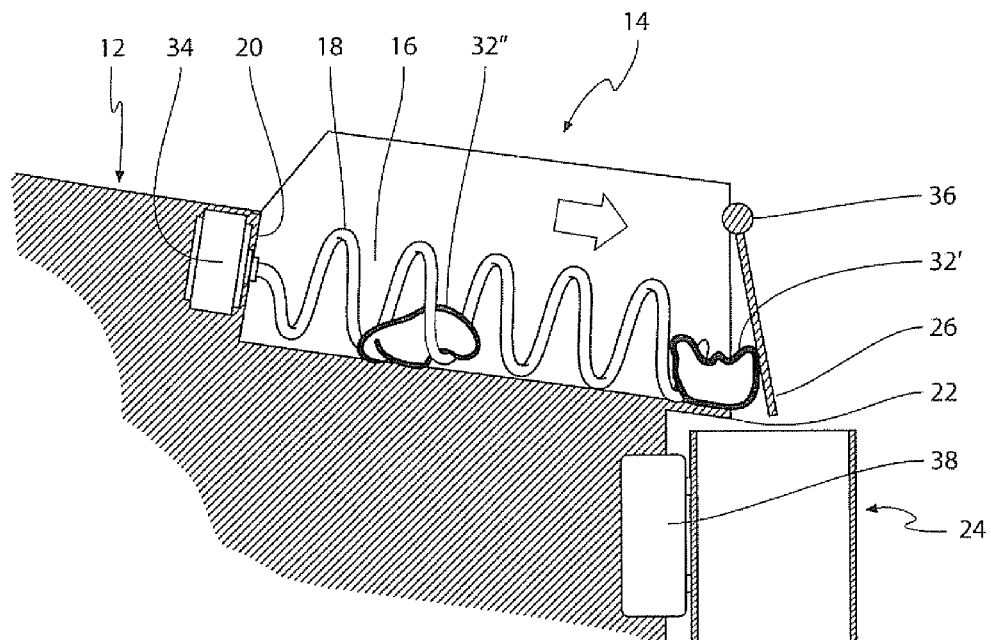
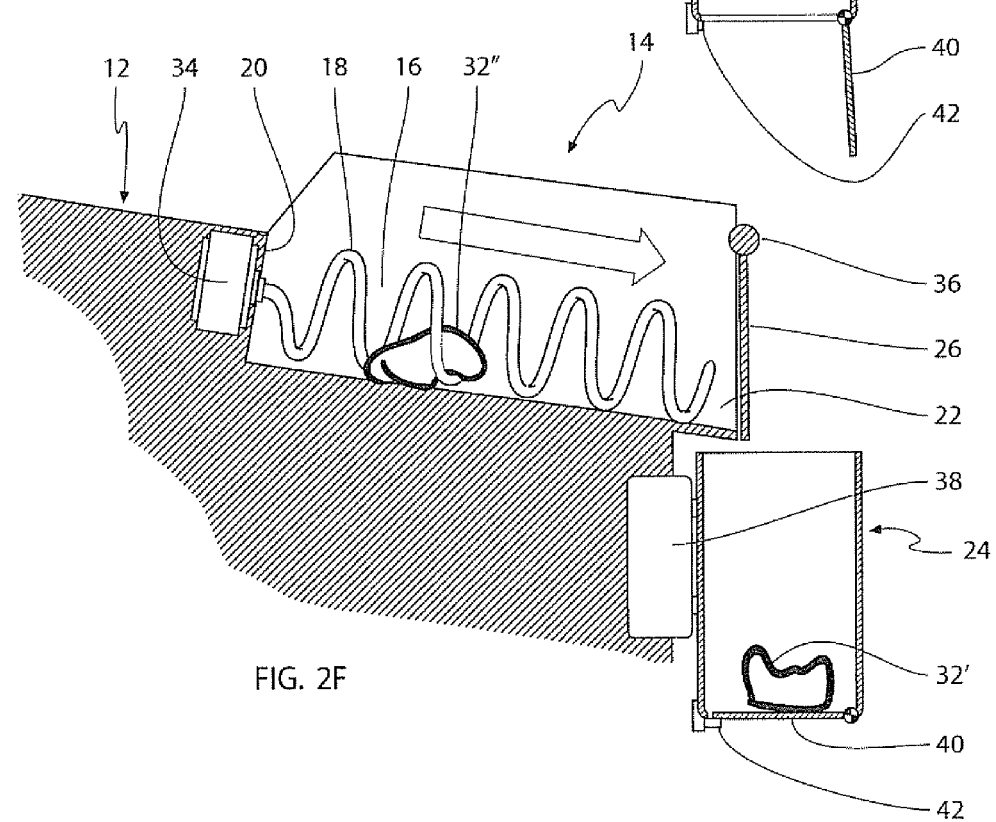

APPARATUS FOR CONVEYING AND SELECTIVELY DISCHARGING PRODUCTS

CROSS-REFERENCE TO RELATED APPLICATION

This application is a national phase filing, under 35 U.S.C. §371(c), of International Application No. PCT/EP2012/051830, filed on Feb. 3, 2012, and it claims priority, under 35 U.S.C. §119(e), from U.S. Provisional Patent Application Ser. No. 61/441,978, filed on Feb. 11, 2011 the disclosure of which is hereby incorporated by reference in its entirety.

FEDERALLY SPONSORED RESEARCH OR DEVELOPMENT

Not Applicable

BACKGROUND

The present invention relates to methods and systems for conveying and selectively discharging food products. Further, the present invention relates to methods and systems for weighing and sorting food products.

Within industries such as foodstuffs industry, weighing and sorting machines have been described in publications such as U.S. Pat. No. 6,234,297, U.S. Pat. No. 6,015,049, WO 98/49892, U.S. Pat. No. 6,321,914, U.S. Pat. No. 5,526,437, U.S. Pat. No. 4,569,434, EP 0 593 126 and EP 0 900 601, all of which US patents are hereby incorporated in the present specification by reference.

In the foodstuffs industry there is a need for sorting products or articles at high speeds or throughputs according to various physical characteristics such as size, colour or weight, alternatively by any combination of these. Industrially packed food products, such as pieces of poultry, are often packed in packages of approximately equal weight, independent of the number of pieces included in the package. Therefore, many packages of food products include more than one individual product, i.e. the packages normally include at least two products. Some product packages, such as packages of chicken breast, typically include three pieces in each package, however, the number may be greater such as four or five pieces within the same package, as long as the packages all have approximately the same weight.

In order to ensure that food products of varying weight may be combined in packages having approximately the same weight, a multihead weigher may be used. In a multihead weigher, which in principal is known in the prior art, individual pieces of food products are randomly distributed among a large number, such as 5-50, preferably 8-20, of weighing systems. The weighing system typically has the form of receptacles. A computer is then used to calculate the most favorable combination of receptacles to reach a target weight, and the chosen receptacles are subsequently emptied such that the food products contained in the receptacle leave the receptacle and end up in a common package. It is thereby a need to keep the weight of the products contained within each receptacle as low as possible such that a large number of combinations are feasible. For an optimal number of combinations, it is a feature of the present invention that no more than one food product at a time is received within each receptacle.

In the applicant's international application WO 2006/092148 a weighing arrangement is shown having a dosing mechanism for controlled conveying of product material portions from an in feed to a weighing system. The dosing mechanism comprises a motor-driven transport screw formed as a helically shaped rod positioned in an open trough for conveying the product material.

Such dosing mechanisms as described above provide a very gentle and accurate delivery of products to the weighing system. However, in some situations the applicant has experienced that more than one product at a time may be delivered to the weighing system. The delivery of more than one product at a time to each receptacle may in particular occur when a plurality of products are located in an overlapping relationship. In case more than one product is located within a single receptacle, it will be more difficult to combine the content of the receptacle with the other pieces received within the other receptacles. In the worst case, no combination will be possible within the target weight and the content of the receptacle must be disposed of, which constitutes a loss of products, or re-circulated, i.e. re-directed to the in feed, which constitutes a loss of time and additional wear on the product. Further recirculation may eventually make the product unusable.

SUMMARY

Thus, it is the object of the present invention to provide techniques for delivering food products one at a time to a receptacle.

It is a particular advantage that the techniques according to the present invention may be implemented into already existing weighing arrangements, such as the arrangement described above, without any real modification of the arrangement itself.

The above need, the above object, the above feature and the above advantage together with numerous other objects, advantages and features which will be evident from the below detailed description of the presently and preferred embodiments, are obtained according to the teachings of a first aspect of the present invention by a method of conveying and selectively discharging a number of food products one at a time, the method comprising:

i) providing a feeding system, the feeding system comprising:
   a) an inlet end for receiving the food products, the food products being substantially solid,
   b) an outlet end for selectively discharging the food products one at a time,
   c) a receptacle located below the outlet end for receiving the individual food product when discharged from the outlet end,
   d) a determination unit located at the outlet end, and
   e) a feeder for conveying the food products from the inlet end to the outlet end, ii) introducing the food products in bulk into the first end of the feeding system individually or in an at least partially overlapping relationship, iii) determining a first operational mode when no food product is present at the outlet end and no food product is present in the receptacle, iv) conveying in the first operational mode by means of the feeder the food products in a direction from the inlet end towards the outlet end at a first average velocity, v) determining a second operational mode when a first individual food product is present at the outlet end and no food product is present in the receptacle, vi) conveying in the second operational mode by means of the feeder the food products in a direction from the inlet end towards the outlet end at a second average velocity, the second average velocity being lower than the first average velocity, vii) determining a third operational mode when the first individual food product is leaving the outlet end or is received within the receptacle, viii) stopping in the third operational mode the feeder until the first individual food product has left the receptacle.

The food products may occasionally be introduced into the inlet of the feeding system one and one, i.e. with a distance or spacing between each of the food products. However, such distances between the food products constitute a loss of time and should therefore in principal be avoided. However, as the food products are provided in bulk and the receipt of food products at the inlet end is at least somewhat random, it may frequently occur that a spacing is present between one or more food products. More often however, as the food products are provided in bulk, the food products enter the inlet in an overlapping relationship, e.g. the rear part of a first food product may be overlapped by or may overlap the front part of a subsequent food product.

The food products may in principle be any food product, however, preferably the food products consist of sticky food products such as pieces of poultry or the like. The size of the food product may range upwardly from a minimum sized product which, at least for industrial purposes, still may be handled individually, such as the size of a chicken wing. The typical size of the food products may be considered to be substantially the size of a chicken breast.

The feeder being powered by a motor, which in turn is controlled by a control unit, transports the food products from the inlet end to an outlet end located opposite the inlet end. The outlet end is monitored by a determination unit, which is as well communicating with the control unit and detects the presence or the non-presence of a food product.

The first operational mode is used when no food product is present at the outlet end. The average velocity used in the feeding mechanism is high, since the time lost between two individual food products should be as short as possible.

When the determination unit detects a food product at the outlet end, the second operational mode is used. In the second operational mode, the average velocity of the feeder is lower, such that the first food product approaches the receptacle slowly. At some point the first food product starts to slide downwardly towards the receptacle by gravity only without or with only limited participation of the feeder. This typically happens when the centre of gravity of the food product is beyond the outlet end. Since the feeder is running at a low velocity, a possible second food product located near the outlet end will remain in the feeding system and will not be pushed into the receptacle.

When the determination unit detects that the individual food product has left the outlet end, the third operational mode is used. In the third operational mode, the feeder is temporarily stopped in order to avoid any second individual food product to enter the receptacle before the receptacle is emptied. After the receptacle is emptied, either the first operational mode may be used in case no food product is present at the outlet end or the second operational mode may be used in case a second food product is present at the outlet end.

According to a further embodiment of the first aspect, in step viii), prior to stopping and provided no second individual food product is present at the outlet end, conveying in the third operational mode by means of the feeder the food products in a direction from the inlet end towards the outlet end at a first average velocity until a second individual food product is present at the outlet end, thereafter stopping.

In case the first individual food product has left the outlet end and there is no second individual food product located at the outlet end, the feeder may, in order to save time, continue to run until the second individual food product is present at the outlet end, at which time the feeder should stop and await the emptying of the receptacle. In case the receptacle then already has been emptied, the feeder may continue in operational mode two immediately, without stopping. However, this scenario typically occurs seldom, since it indicates that the system is not running optimally. In an efficient system, a new piece of food product should be received into the receptacle as soon as possible after it has been emptied.

According to a further embodiment of the first aspect, the determination unit comprises a flap mounted at the outlet end, the flap assuming a first position adjacent the outlet end when no food product is present at the outlet end causing the determination unit to determine the first operational mode, the flap being pushed away from the outlet end when a front portion of an individual food product is present at the outlet end causing the determination unit to determine the second operational mode.

In order to achieve a simple and efficient monitoring of the outlet end of the feeder system, a flap may be used. The flap may comprise a plate or similar structure which is hinged on top of the outlet end such that it initially rests with a lower end at the outlet end. When a first individual food product proceeds towards the outlet end and protrudes beyond the outlet end with its front part, it will pivot the flap outwardly and push the lower end of the plate away from the outlet end. This will cause the determination unit to indicate that the second operational mode should be used. The first individual food product will continue towards the receptacle in a slower pace.

According to a further embodiment of the first aspect, the determination unit comprises a flap mounted at the outlet end, the flap assuming a first position adjacent the outlet end when no food product is present at the outlet end causing the determination unit to determine the first operational mode, the flap being pushed away from the outlet end when a front portion of an individual food product is present at the outlet end causing the determination unit to determine the second operational mode, the flap returning towards the outlet end when a rear portion of an individual food product is present at the outlet end causing the determination unit to determine the third operational mode.

When the first individual food product has left or is about to leave the outlet end, the flap will pivot back towards the outlet end. This indicates that the third operational mode is to be used, i.e. the feeder should be stopped in order to prevent a second individual food product from leaving the outlet end. The receipt of the first individual food product in the receptacle e.g. may be confirmed by the increase in weight of the receptacle. Since the receptacle typically constitutes a weighing pan, this detection requires no real modification to the system as such. In the rare case that no receipt of the food product is confirmed within a short time period, the return of the flap may be caused by an oddly shaped food product and the second operational mode may be resumed.

In case the lower end of the flap only returns partially towards the outlet end, it may indicate that a second food product is located at the outlet end. In this case, the feeder is stopped and after the receptacle has been emptied, the system continues in the second operational mode. Conversely, in case the lower end of the flap returns completely to the position adjacent the outlet end, no food product is present at the outlet end and after the receptacle has been emptied, the system continues in the first operational mode.

According to a further embodiment of the first aspect, the determination unit comprises one of an optical determination unit, a radar determination unit, a mechanical determination unit or a laser determination unit. Other determination units may be contemplated, such as determination units requiring no contact with the food product, e.g. optical such as photocell, laser, radar. Alternatively, other mechanical determination units than the previously described flap may be used such as buttons or the like.

According to a further embodiment of the first aspect, the second average velocity includes stopping the feeder during a specific time period, preferably the feeder is stopped for a time period between 0.1 s and 10 s. In the present context it is referred to an average speed which should be measured over a relatively long time period. The first and second average velocity may be achieved by a motor which varies its speed over time. In some embodiments a motor having a constant high speed may be used and the lower average speed is achieved by stopping and starting the motor. This may simplify the control unit of the motor.

According to a further embodiment of the first aspect, the feeder of the feeding system comprises one of a belt conveyor, a roller conveyor and a vibrating conveyor. The type of conveyor used may vary depending on the type of food product to be conveyed.

According to a further embodiment of the first aspect, the feeder comprises a screw conveyor. Preferably, in the present context a screw conveyor is used. The benefits of the screw conveyor are mentioned above as well as in the cited prior art document WO 2006/092148.

According to a further embodiment of the first aspect, the screw conveyor is exchangeable by means of a click-on mechanism. An easily exchangeable screw conveyor allows for easy cleaning of the system and for a quickly adaptation of the system to a different food product, e.g. a large screw for chicken breasts and a small screw for chicken wings.

According to a further embodiment of the first aspect, the screw conveyor has an increasing pitch along its length. An increasing pitch along the conveying path between the inlet and the outlet allows the gentle transport of the product material.

According to a further embodiment of the first aspect, the screw conveyor is constituted by a helical rod. A helical rod allows the food products to be conveyed gently and in a well-defined path.

According to a further embodiment of the first aspect, the helical rod includes a core or alternatively the helical rod is coreless. The provision of a core may prevent product material from falling between the turns of the helical rod. However, a coreless screw conveyor may prevent food products from being squeezed between the core and the helical rod. In some embodiments the core may rotate synchronously with the helical rod or alternatively, be stationary.

The above need, the above object, the above feature and the above advantage together with numerous other objects, advantages and features which will be evident from the below detailed description of the presently and preferred embodiments, are obtained according to the teachings of a second aspect of the present invention by a feeding system for conveying and selectively discharging a number of food products one at a time, the feeding system comprising:

a) an inlet end for receiving the food products, the food products being substantially solid, the food products being introduced in bulk into the first end of the feeding system individually or in an at least partially overlapping relationship, b) an outlet end for selectively discharging the food products one at a time, c) a receptacle located below the outlet end for receiving the individual food product when discharged from the outlet end, d) a determination unit located at the outlet end, the determination unit determining a first operational mode when no food product is present at the outlet end and no food product is present in the receptacle, a second operational mode when a first individual food product is present at the outlet end and no food product is present in the receptacle, and, a third operational mode when the first individual food product is leaving the outlet end or is received within the receptacle, and e) a feeder for conveying the food products from the inlet end to the outlet end, the feeder conveying:

i) in the first operational mode by means of the feeder the food products in a direction from the inlet end towards the outlet end at a first average velocity, ii) in the second operational mode by means of the feeder the food products in a direction from the inlet end towards the outlet end at a second average velocity, the second average velocity being lower than the first average velocity, iii) in the third operational mode stopping the feeder until the first individual food product has left the receptacle.

The above system according to the second aspect is preferably used together with the above method according to the first aspect.

The above need, the above object, the above feature and the above advantage together with numerous other objects, advantages and features which will be evident from the below detailed description of the presently and preferred embodiments, are obtained according to the teachings of a third aspect of the present invention by a multihead weighing system comprising a plurality of feeding systems according to the second aspect and a receiving section for receiving a plurality of food products in bulk, the receiving section communicating with each inlet end of each feeding system, each of the receptacles of each feeding system constituting a weighing pan.

The receiving section preferably has a conical shape such that the food products released from above may slide towards the entry ends of the feeding systems. The multihead weighing system is preferably controlled by a control unit, which monitors the weight of the food products received in the receptacle and the result of the determination of the current operational mode. The control unit controls, based on the above information, the emptying of the receptacle and the velocity of the screw conveyer.

According to a further embodiment of the third aspect, the receiving section is centrally located and the plurality of feeding systems are distributed around the centrally located receiving section.

In order to save space and to achieve an even distribution of food products, the above circular configuration of the multihead weighing assembly is preferred.

BRIEF DESCRIPTION OF THE DRAWINGS

FIGS. 2A-2F are simplified cross-sectional views showing a plurality of food products being conveyed by the feeding system of FIG. 1;

DETAILED DESCRIPTION

Figure 1:
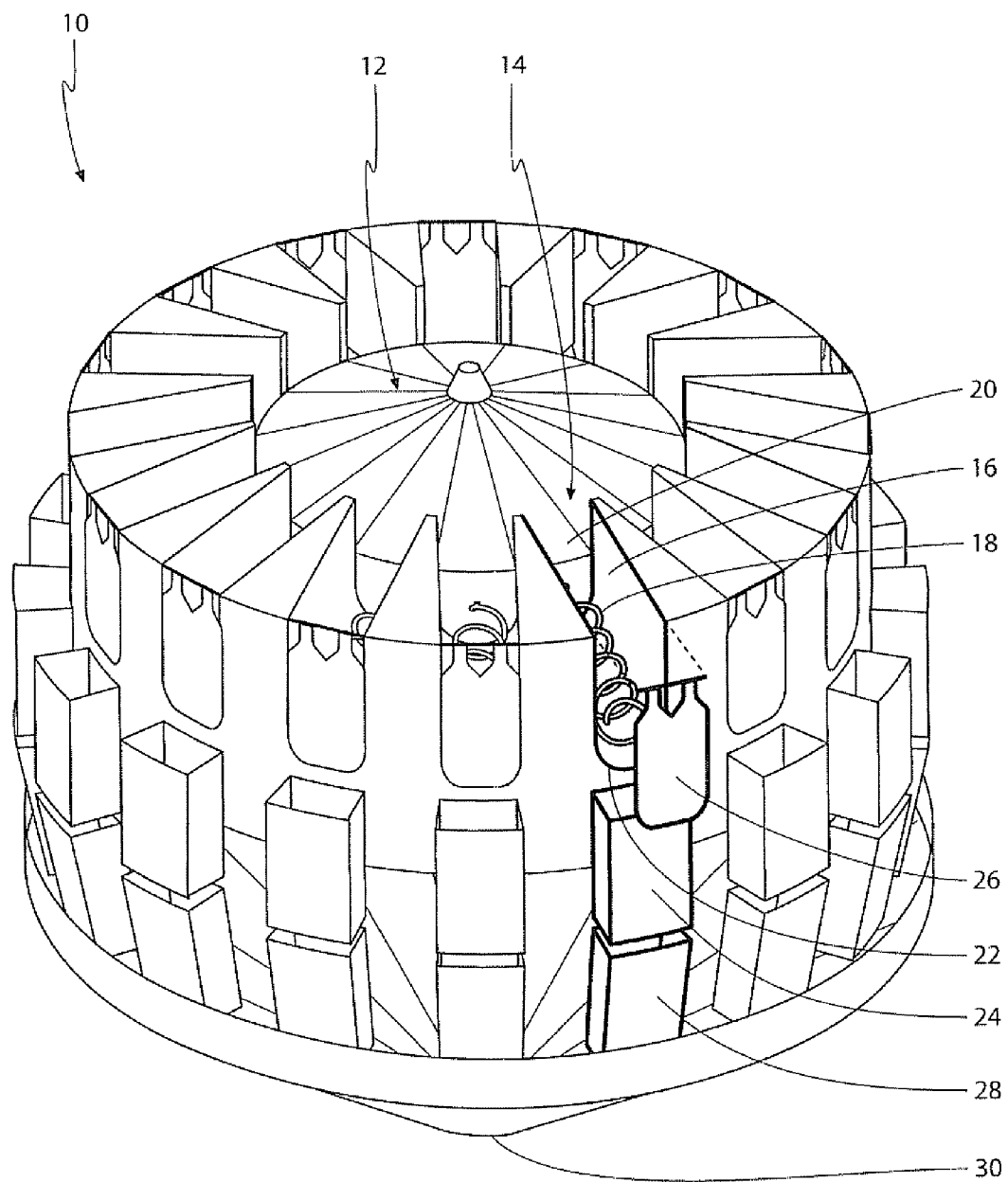
FIG. 1 is a multihead weigher including a feeding system.

FIG. 1 shows a multihead weighing arrangement 10 including a receiving section 12 and a feeding system 14. The receiving section 12 has a conical shape for receiving food products being delivered from above the receiving section 12. The food products (not shown here) may be sticky food products such as pieces of poultry. The food products are typically distributed randomly on the receiving section 12 and will due to the conical shape of the receiving section 12 move towards the periphery of the receiving section 12. The receiving section 12 may optionally be rotating in order to distribute the food products more evenly along the periphery of the receiving section 12 and for avoiding any food products remaining for a longer time on the receiving section 12. At the periphery of the receiving section 12 the plurality of feeding systems, all given the reference numeral 14, are located. Each feeding system 14 comprises a feeding channel 16, in which a screw conveyor 18 is located. The screw conveyor typically constitutes a helically shaped hollow rod. The distance between two turns typically corresponds to the size of the food product to be conveyed, e.g. about 0.1 m in case of a chicken breast. The feeding channel 16 extends from an inlet end 20 located adjacent the receiving section 12 and an outlet end 22 located opposite the inlet end 20. Below the outlet end 22 a weighing pan constituting a receptacle 24 is located. The outlet end 22 of the feeding channel 16 is covered by a pivotable flap 26, which will be discussed in more detail below. Food products entering the receiving section 12 will be randomly distributed among the feeding systems 14. Thus, an individual food product will enter the inlet end 20 of one feeding system 14 and be carried along the feeding channel 16 by the screw conveyor 18 towards the outlet end 22. The flap 26, which constitutes a part of a determination unit, as will be described in detail in connection with FIG. 2, detects the presence of the food product and allows an individual food product to enter the receptacle 24. The receptacle 24 is subsequently emptied into a hollow shaft 28, which leads towards a delivering chute 30. In practice, the content of two or more receptacles 24, which content in total has a weight approximately corresponding to the predetermined target weight, is emptied into the chute 30. The food products thus received in the delivering chute 30 are delivered to a packing station (not shown here), in which the combined food products are packaged in a single package.

Figure 2A:
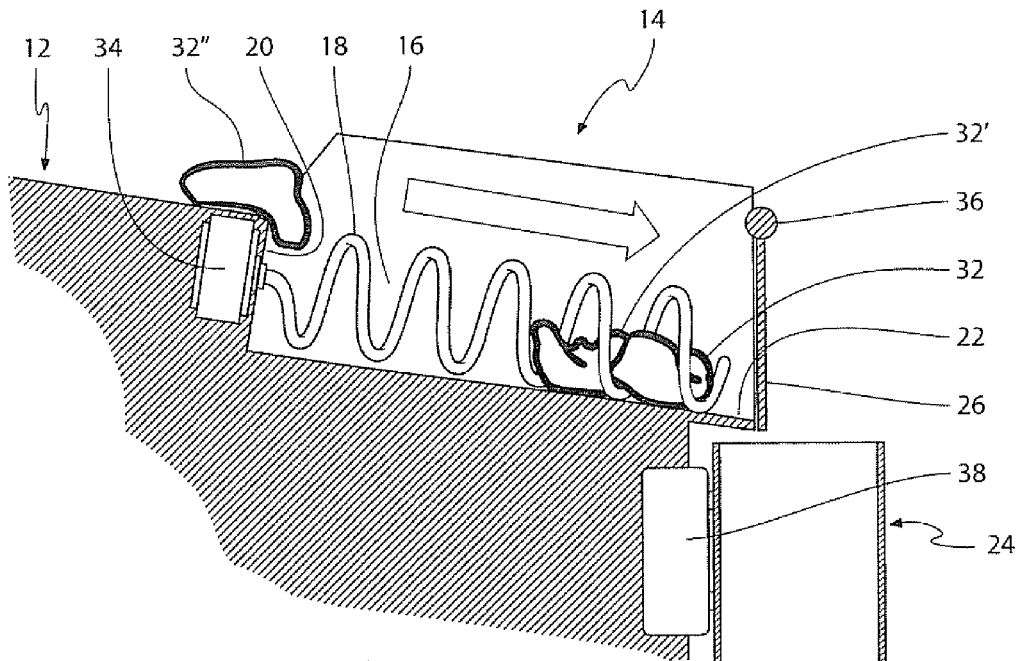

FIG. 2A shows a cut-out view of a feeding system 14 operating in a first operational mode. The feeding channel 16 of the feeding system 14 includes a first food product 32 and a second food product 32' partially overlapping the first food product 32, both food products 32, 32' being conveyed towards the flap 26 by means of the screw conveyor 18. A third food product 32" is located at the periphery of the receiving section 12 at the inlet end of the feeding system 14. The screw conveyor 18 is driven by an electrical motor 34. In the present first operational mode no food product has reached the outlet end of the feeding system 14. The flap 26, which is hinged by a hinge 36 located above the outlet end 22, thus, does not detect any food products. Thus, in the first operational mode the motor 34 drives the screw conveyor 18 at a high velocity. The high velocity may be achieved by running the screw conveyor at a rotational speed of e.g. 0.5 to 5 revolutions per second. The receptacle 24 is supported by a receptacle support 38, which as well measures the weight of the content of the receptacle 24. The lower end of the receptacle 24 is closed off by a door 40. The door 40 is held in a closed position by a locking mechanism 42.

Figure 2B:
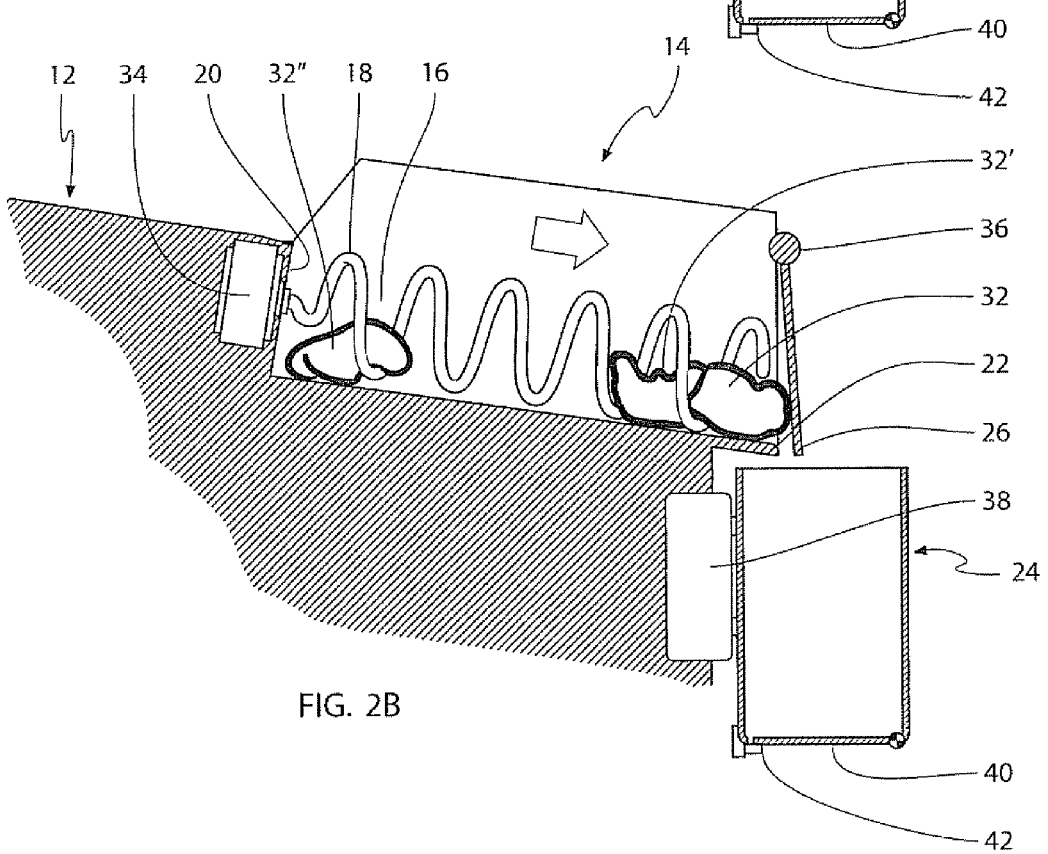

FIG. 2B shows a feeding system 14 operating in a second operational mode. The feeding system enters the second operational mode when the determination unit comprising the flap 26 and the hinge 36 detects the presence of the first food product 32 at the outlet end 22 of the feeding system 14. The presence of the first food product 32 at the outlet end 22 is detected by means of the outwardly pivoting of the flap 26 around the hinge 36. In the second operational mode the motor 34 drives the screw conveyor 18 at a low velocity. The low velocity may be achieved by running the screw conveyor at a speed of e.g. 0.1-0.5 revolutions per second. Alternatively, the screw conveyor is interchangeably running at a higher speed and stopped for about 0.5 s.

Figure 2C:
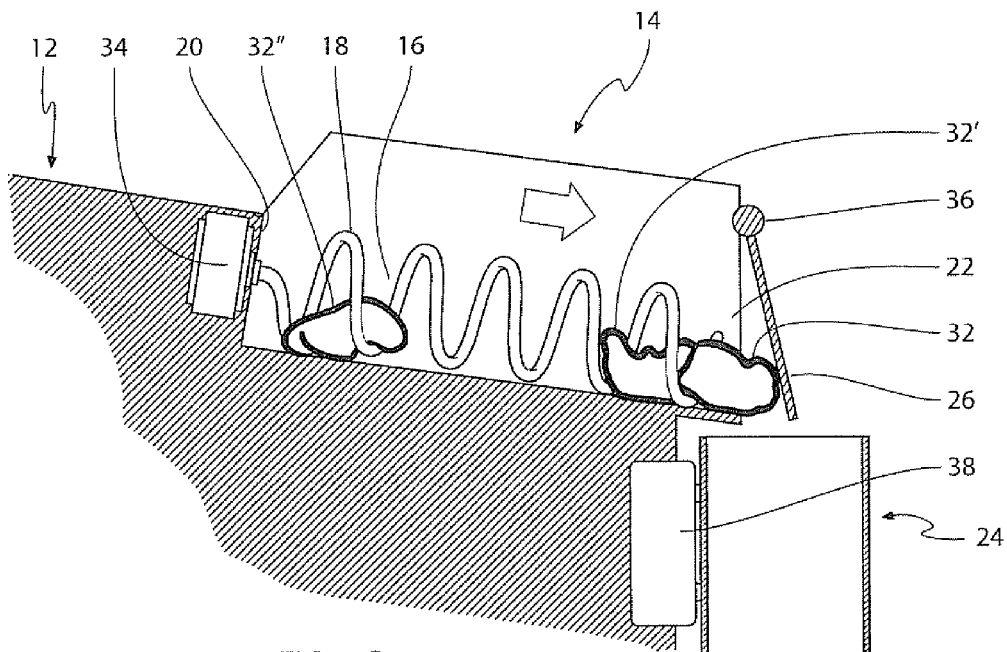

FIG. 2C shows the feeding system 14 operating in the second operational mode. In the second operational mode the first food product is slowly pressed beyond the outlet end 22 and pushing the flap 26 further away from the outlet end 22. When the first food product 32 is about to leave the outlet end 22, the flap 26 will begin to move or pivot back towards the outlet end 22. In this moment the feeding system 14 enters a third operational mode, which will be described in more detail below.

Figure 2D:
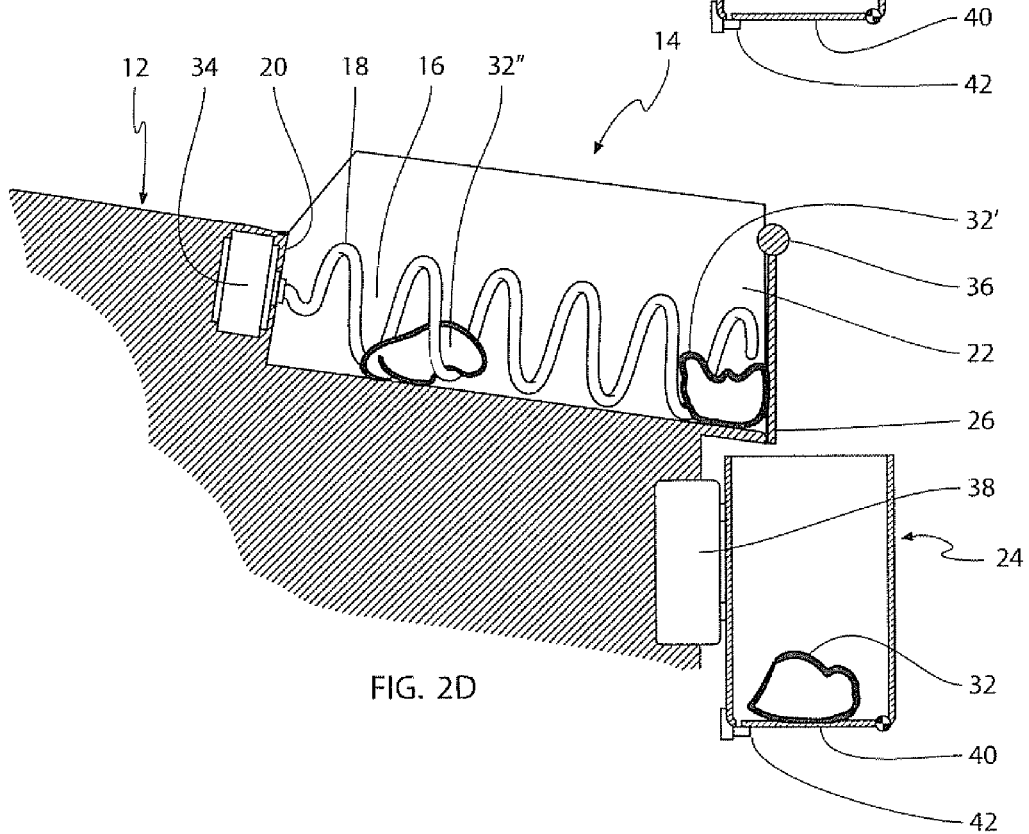

FIG. 2D shows a feeding system 14 in a third operational mode. In the present situation the first food product 32 has left the outlet end 22 of the feeding system 14, the flap 26 has moved back towards the outlet end 22 and the motor 34 driving the screw conveyor 18 has stopped in order to prevent the second food product 32' from leaving the outlet end 22 of the feeding system 14. The first food product 32 is received at the bottom of the receptacle 24.

FIG. 2E shows the feeding system 14 when returning from the third operational mode to the second operational mode. When the weighing is completed and the door 40 opens by unlocking the locking mechanism 42, the first food product 32 will leave the receptacle 24. In the present situation a second food product 32' is located at the outlet end 22 and thus the second operational mode is resumed. In the second operational mode as stated above the motor 34 drives the screw conveyor 18 at a low velocity as indicated by the arrow. The door 40 is closed as soon as possible after emptying the first food product 32 in order to be ready to receive the second food product 32'.

FIG. 2F shows a feeding system 14 when in an alternative third operational mode. In the present third alternative operational mode the second food product 32' remains in the receptacle 24 while no food product is present at the outlet end 22 of the feeding system 14. In the present situation the screw conveyor 18 is not stopped and instead the electrical motor 34 drives the screw conveyor 18 in a high velocity similar to the first operational mode. However, in case the third food product 32" located in the feeding channel 16 enters the outlet end 22 of the feeding system 14 and thereby pushes the flap 26 outwardly, the screw conveyor is stopped in order to prevent the third food product 32" from entering the receptacle 24 before the second food product 32' has left the receptacle 24.

Figure 3:
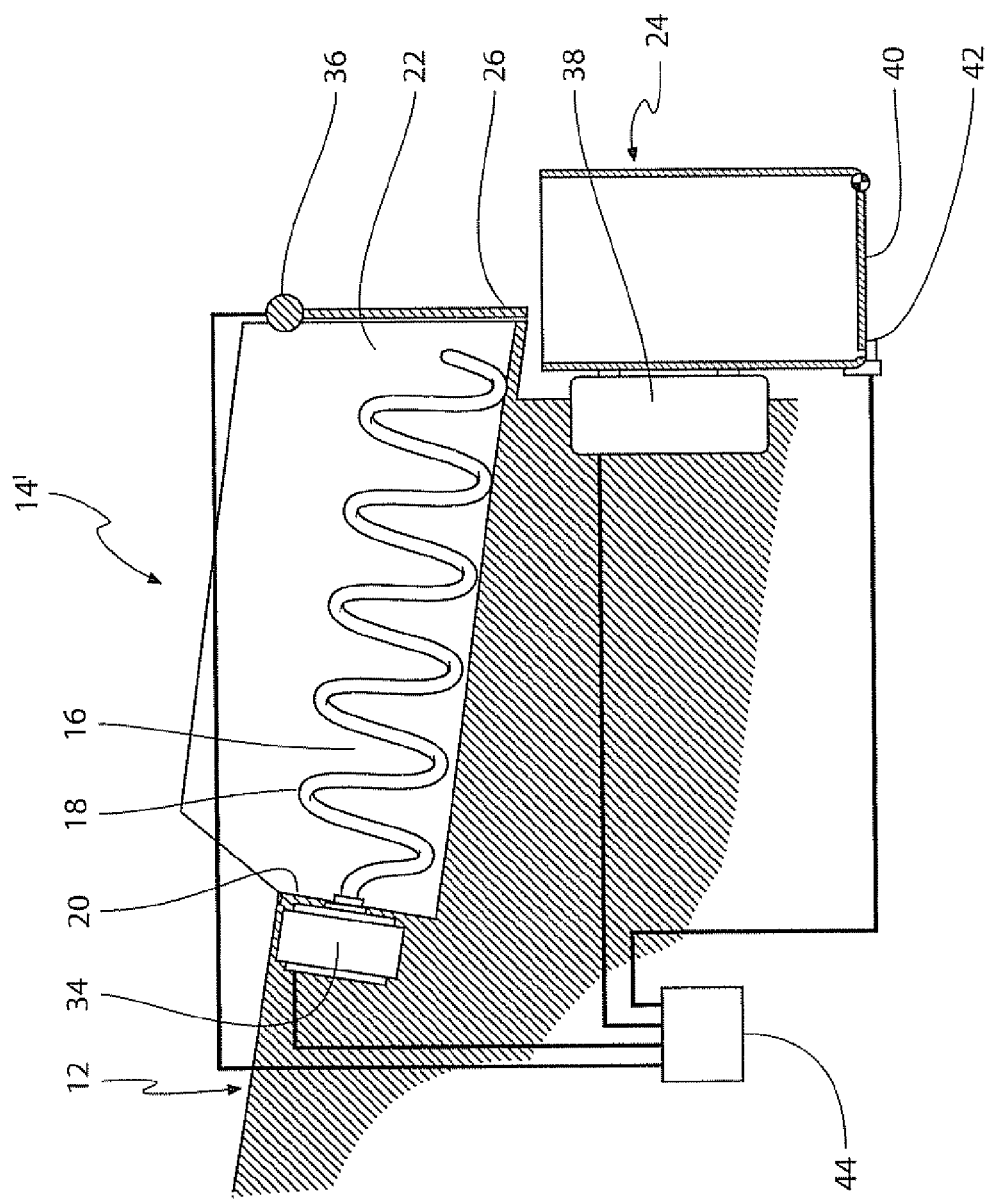
FIG. 3 is a simplified cross-sectional view of a feeding system including a control unit.

FIG. 3 shows the feeding system $14'$ including a control unit 44. The control unit 44 is connected to the hinge 36 of the flap 26, the motor 34 of the screw conveyor 18, the support 38 of the receptacle 24 and the locking mechanism 42 of the door 40. In this way the control unit 44 may detect the angle and the angular velocity of the hinge 36 and the weight of the content of the receptacle 24. This information may be used to control the velocity of the motor 34 and the locking and unlocking of the locking mechanism 42.

Figure 4A:
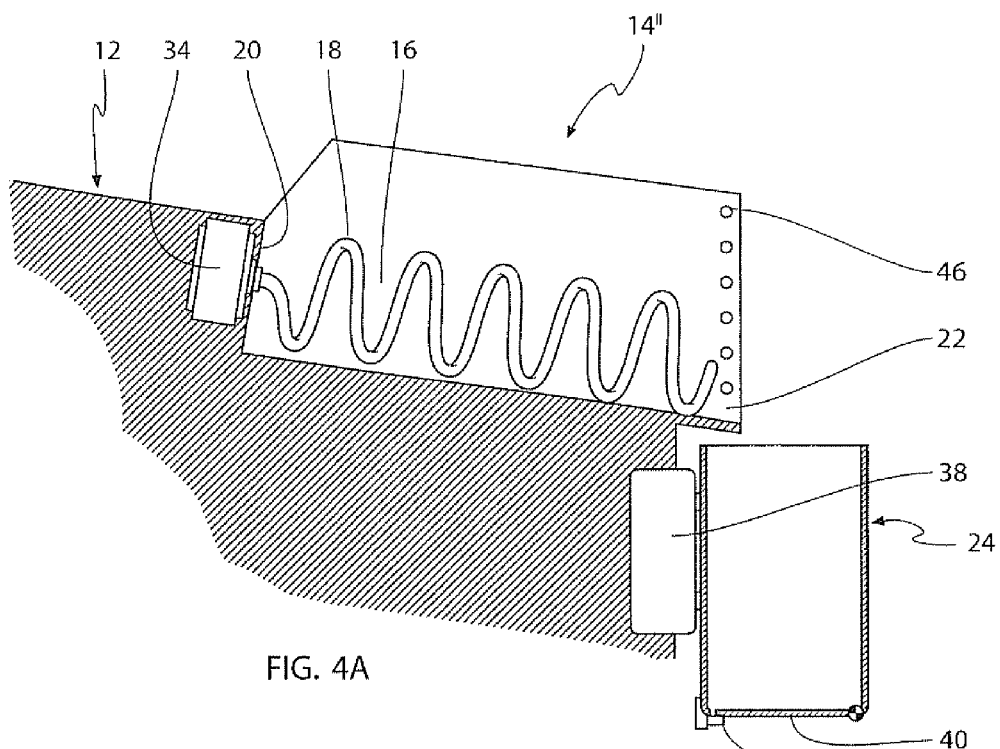
FIGS. 4A and 4B are simplified cross-sectional views showing feeding systems having alternative determination units.

FIG. 4A shows an alternative embodiment of a feeding system $14''$. In the alternative embodiment $14''$ the flap 26 and the hinge 36 are replaced by photocells 46. The presence of a food product at the outlet end 22 is detected by the photocells 46 and as a consequence the second operational mode may be initiated.

Figure 4B:
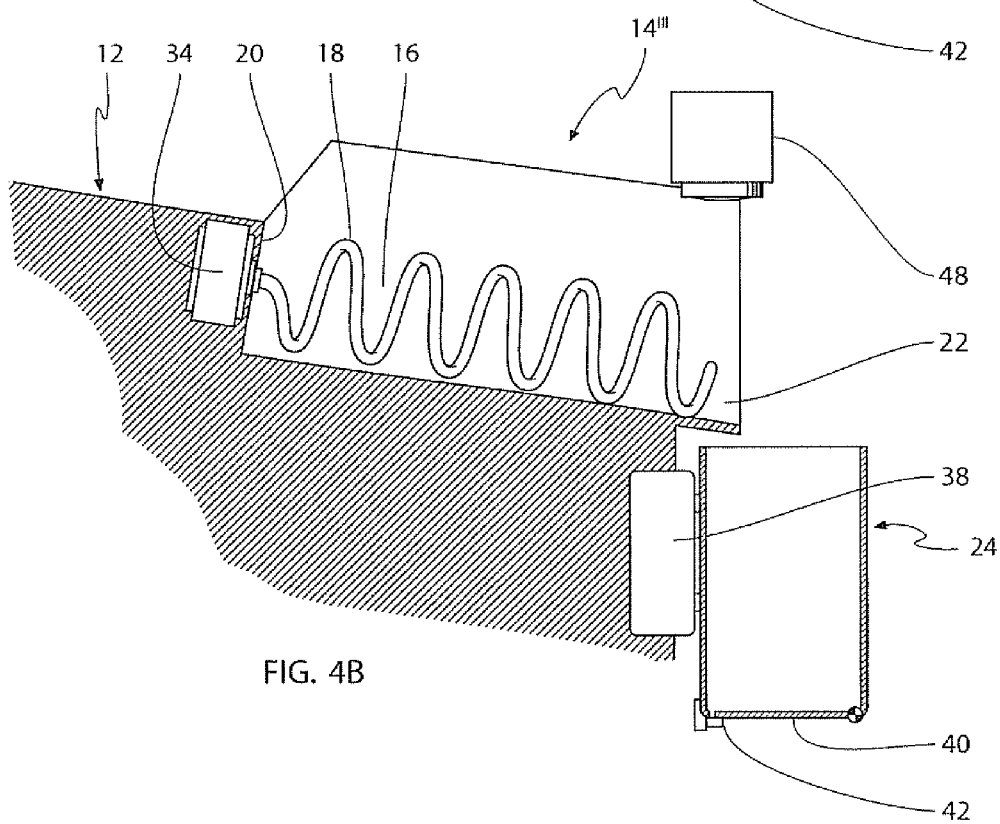

FIG. 4B shows a further alternative embodiment of the feeding system 14$^{III}$, in which the photocells have been replaced by a different electromagnetic determination unit such as a radar or a laser 48.

Figure 5A:
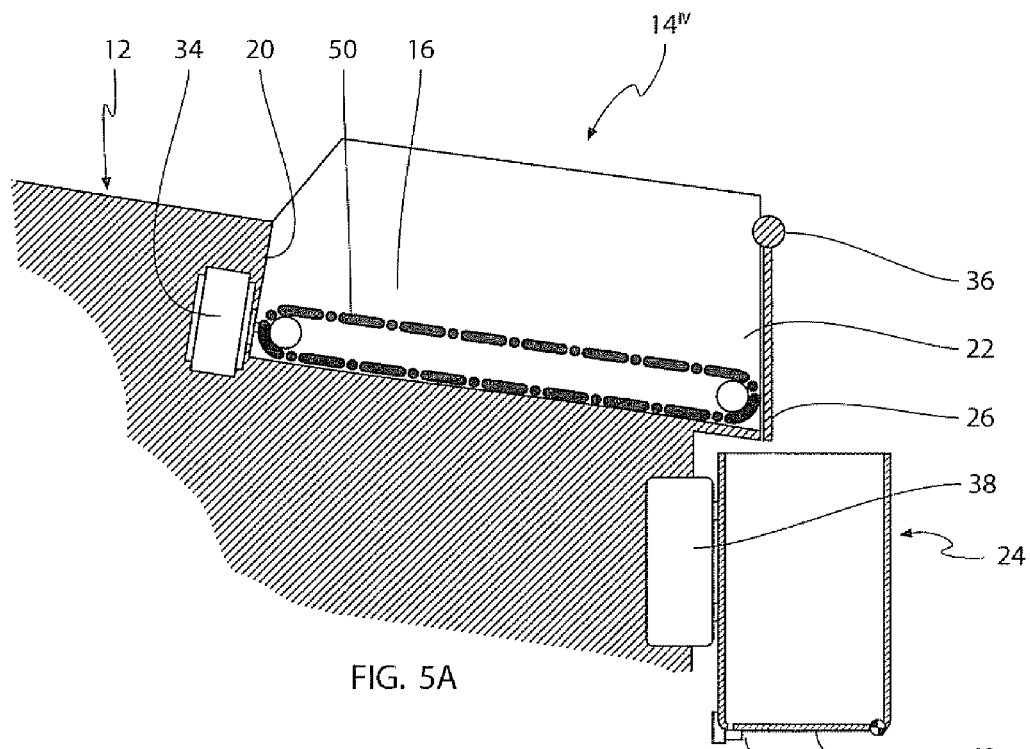
FIGS. 5A-5E are simplified cross-sectional views showing feeding systems having alternative feeders.

FIG. 5A shows a further embodiment of the feeding system 14$^{IV}$, in which the screw conveyor has been replaced by a belt conveyor 50. A belt conveyor may be preferred in case the food products to be conveyed are very fragile.

Figure 5B:
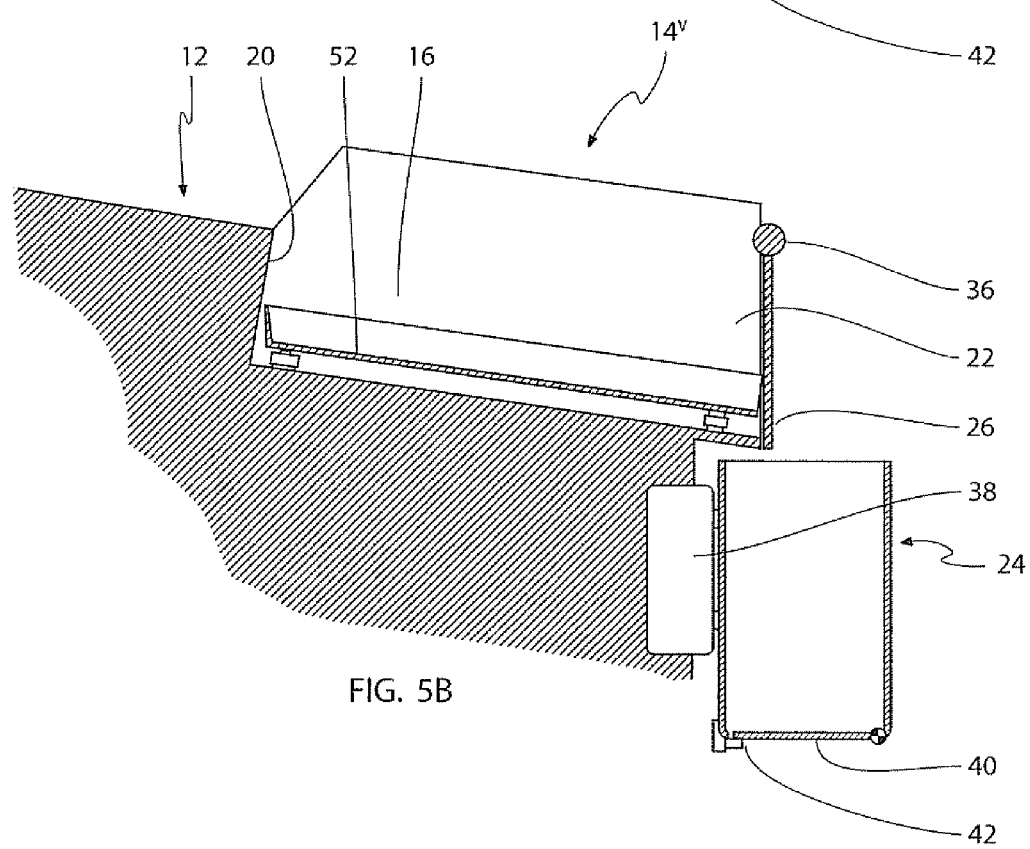

FIG. 5B shows a further embodiment of a feeding system 14$^V$, in which the belt conveyor has been replaced by a vibrating conveyor 52. Vibrating conveyors, on the other hand, may be used in case the food products are very robust.

Figure 5C:
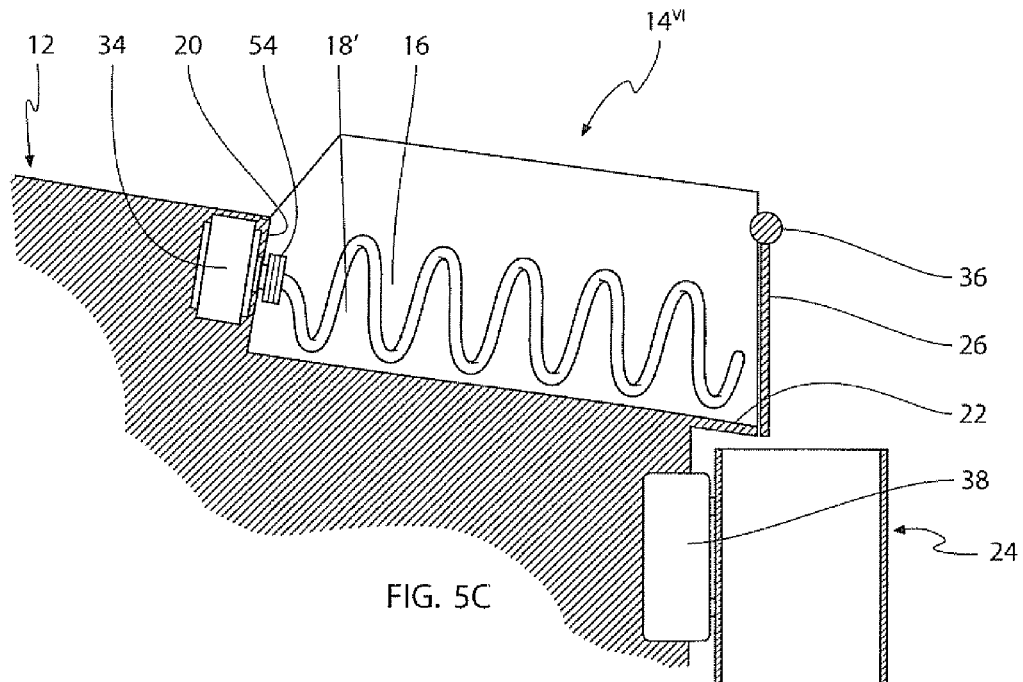

FIG. 5C shows an alternative embodiment of a feeding system 14$^{VI}$, in which the screw conveyor 18' is connected to the motor 34 by means of a click-on mechanism 54. The connection between the motor axle and the screw conveyor typically comprises connecting a female part attached to the end of the motor axle to a male part attached to the end of the screw conveyor, or vice versa. The click-on mechanism may be e.g. provided by means of a generally known bayonet coupling between the motor and the screw conveyor. Other possibilities include a spring and a protruding ball located at the end of the screw conveyer and a corresponding recess provided in the motor axle. The connection between the screw conveyor and the axle is achieved by pressing and interlocking the ball with the corresponding recess provided in the motor axle.

Figure 5D:
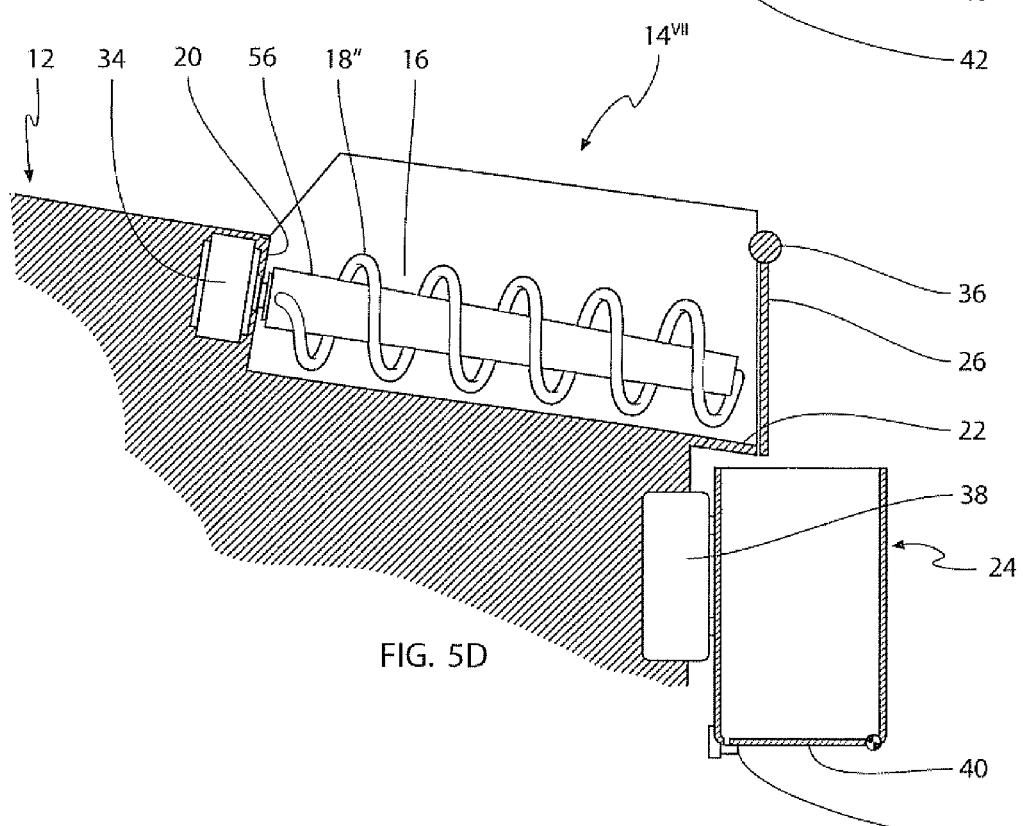

FIG. 5D shows a further embodiment of a feeding system 14$^{VII}$, in which the screw conveyor 18" is provided with a core 56. A core will prevent any food product from falling to the bottom of the channel 16. A product falling between two turns of the screw conveyor 18 may sometimes get stuck between the bottom of the channel 16 and the screw conveyor. By providing the core 56, all food products are transported above the core in the upwardly oriented portion of the screw conveyor 18" and thus the food products will not be stuck.

Figure 5E:
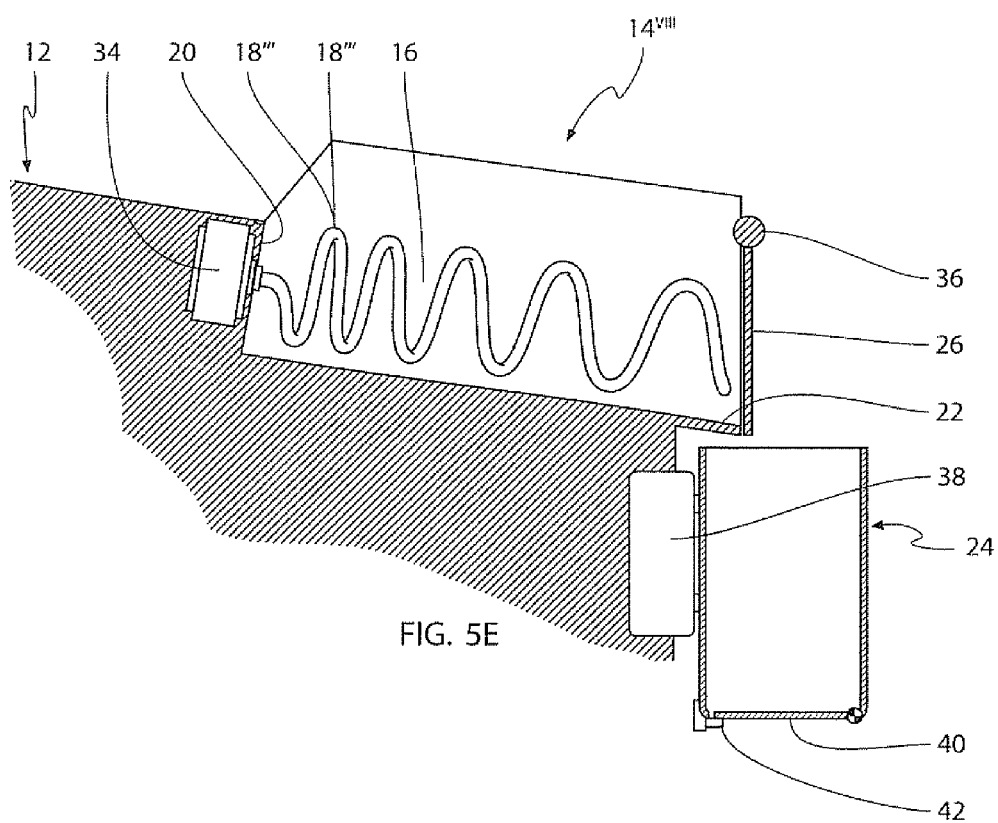

FIG. 5E shows a further embodiment of a feeding system 14$^{VIII}$, in which the screw conveyor 18' has an increasing pitch along its length from the inlet end 20 to the outlet end 22. By increasing the pitch of the screw conveyor slightly, i.e. increasing the distance between two turns of the screw along the distance between the inlet and the outlet, it is ensured that no food product is squeezed between two turns of the screw.

The present invention is not to be considered limited by the examples described above, e.g. increasing the radius of the system and retaining the dimensions of the receptacles results in the possibility of increasing the number of receptacles thereby increasing the throughput of the system. Further, although the above examples concern food products only, the above techniques are equally applicable to similar non-food products.

LIST OF PARTS WITH REFERENCE TO THE FIGURES

10. Multihead weighing arrangement
12. Receiving section
14. Feeding system
16. Feeding channel
18. Screw conveyor
20. Inlet end
22. Outlet end
24. Receptacle
26. Flap
28. Shaft
30. Delivery chute
32. Food product
34. Electrical motor
36. Hinge
38. Receptacle support
40. Door
42. Locking mechanism
44. Control unit
46. Photocells
48. Radar/Laser
50. Belt conveyor
52. Vibrating conveyor
54. Click-on mechanism
56. Core

The invention claimed is:

1. A method of conveying and selectively discharging individual food products one at a time, the method comprising:
   i) providing a feeding system, comprising:
      a) an inlet end configured for receiving a plurality of substantially solid individual food products;
      b) an outlet end configured for selectively discharging the individual food products one at a time;
      c) a receptacle located below the outlet end and configured for receiving the individual food product when discharged from the outlet end;
      d) a determination unit located at the outlet end; and
      e) a feeder configured for conveying the food products from the inlet end to the outlet end;
   ii) introducing the food products in bulk into the inlet end of the feeding system individually or in a partially overlapping relationship;
   iii) determining a first operational mode when no food product is present at the outlet end and no food product is present in the receptacle;
   iv) in the first operational mode, conveying, by the feeder, the food products in a direction from the inlet end towards the outlet end at a first average velocity;
   v) determining a second operational mode when a first individual food product is present at the outlet end and no food product is present in the receptacle;
   vi) in the second operational mode, conveying, by the feeder, the food products in a direction from the inlet end towards the outlet end at a second average velocity that is lower than the first average velocity;
   vii) determining a third operational mode when the first individual food product either leaving the outlet end or is received within the receptacle; and
   viii) in the third operational mode, stopping the feeder until the first individual food product has left the receptacle.

2. The method according to claim 1, wherein step viii) includes, prior to stopping and provided that a second individual food product is not present at the outlet end, conveying in the third operational mode by the feeder the food products in a direction from the inlet end towards the outlet end at a first average velocity until the second individual food product is present at the outlet end, and thereafter stopping.

3. The method according to claim 1, wherein the determination unit comprises a flap mounted at the outlet end, the flap being configured to assume a first position adjacent the outlet end when no food product is present at the outlet end, thereby causing the determination unit to determine the first operational mode, the flap being further configured to be pushed away from the outlet end when a front portion of an individual food product is present at the outlet end, thereby causing the determination unit to determine the second operational mode.

4. The method according to claim 1, wherein the determination unit comprises a flap mounted at the outlet end, the flap being configured to assume a first position adjacent the outlet end when no food product is present at the outlet end, thereby causing the determination unit to determine the first operational mode, the flap being further configured to be pushed away from the outlet end when a front portion of an individual food product is present at the outlet end, thereby causing the determination unit to determine the second operational mode, the flap being still further configured to return towards the outlet end when a rear portion of an individual food product is present at the outlet end, thereby causing the determination unit to determine the third operational mode.

5. The method according to claim 1, wherein the determination unit is selected from the group consisting of an optical determination unit, a radar determination unit, a mechanical determination unit, and a laser determination unit.

6. The method according to claim 1, wherein the second average velocity is achieved by stopping the feeder for a time period between 0.1 s and 10 s.

7. The method according to claim 1, wherein the feeder is selected from the group consisting of a belt conveyor, a roller conveyor, and a vibrating conveyor.

8. The method according to claim 1, wherein the feeder comprises a screw conveyor.

9. The method according to claim 8, wherein the screw conveyor is exchangeable by means of a click-on mechanism.

10. The method according to claim 8, wherein the screw conveyor has an increasing pitch along its length.

11. The method according to claim 8, wherein the screw conveyor comprises a helical rod.

12. The method according to claim 11, wherein the helical rod includes a core.

13. The method according to claim 11, wherein the helical rod is coreless.

14. A feeding system for conveying and selectively discharging individual food products one at a time, comprising:
- an inlet end configured for receiving a plurality of substantially food products introduced in bulk into the inlet end individually or in a partially overlapping relationship;
- an outlet end configured for selectively discharging the food products one at a time;
- a receptacle located below said outlet end configured for receiving the individual food products when discharged from the outlet end;
- a determination unit located at the outlet end and configured for determining (i) a first operational mode when no food product is present at the outlet end and no food product is present in the receptacle, (ii) a second operational mode when a first individual food product is present at the outlet end and no food product is present in the receptacle, and (iii) a third operational mode when the first individual food product either is leaving the outlet end or is received within the receptacle; and
- a feeder configured for conveying the food products from the inlet end to the outlet end, the feeder being operable for conveying the food products:
  i) in the first operational mode, in a direction from the inlet end towards the outlet end at a first average velocity;
  ii) in the second operational mode, in a direction from the inlet end towards the outlet end at a second average velocity that is lower than the first average velocity; and
  iii) in the third operational mode, stopping the feeder until the first individual food product has left the receptacle.

15. A multihead weighing system comprising;
(1) a plurality of feeding systems, each of the feeding systems comprising:
- (a) an inlet end configured for receiving a plurality of substantially food products introduced in bulk into the inlet end individually or in a partially overlapping relationship;
- (b) an outlet end configured for selectively discharging the food products one at a time;
- (c) a receptacle located below said outlet end configured for receiving the individual food products when discharged from the outlet end, the receptacle comprising a weighing pan;
- (d) a determination unit located at the outlet end and configured for determining (i) a first operational mode when no food product is present at the outlet end and no food product is present in the receptacle, (ii) a second operational mode when a first individual food product is present at the outlet end and no food product is present in the receptacle, and (iii) a third operational mode when the first individual food product either is leaving the outlet end or is received within the receptacle; and
- (e) a feeder configured for conveying the food products from the inlet end to the outlet end, the feeder being operable for conveying the food products:
  i) in the first operational mode, in a direction from the inlet end towards the outlet end at a first average velocity;
  ii) in the second operational mode, in a direction from the inlet end towards the outlet end at a second average velocity that is lower than the first average velocity; and
  iii) in the third operational mode, stopping the feeder until the first individual food product has left the receptacle;

and (2) a receiving section configured for receiving a plurality of food products in bulk, the receiving section being further configured for communicating with each inlet end of each of the feeding systems.

16. The multihead weighing system according to claim 15, wherein the receiving section is centrally located with respect to the plurality of feeding systems, and wherein the feeding systems are distributed around the centrally located receiving section.

* * * * *